C. E. ZORTMAN.
DERAILING DEVICE.
APPLICATION FILED JUNE 6, 1917.
1,368,008.
Patented Feb. 8, 1921.
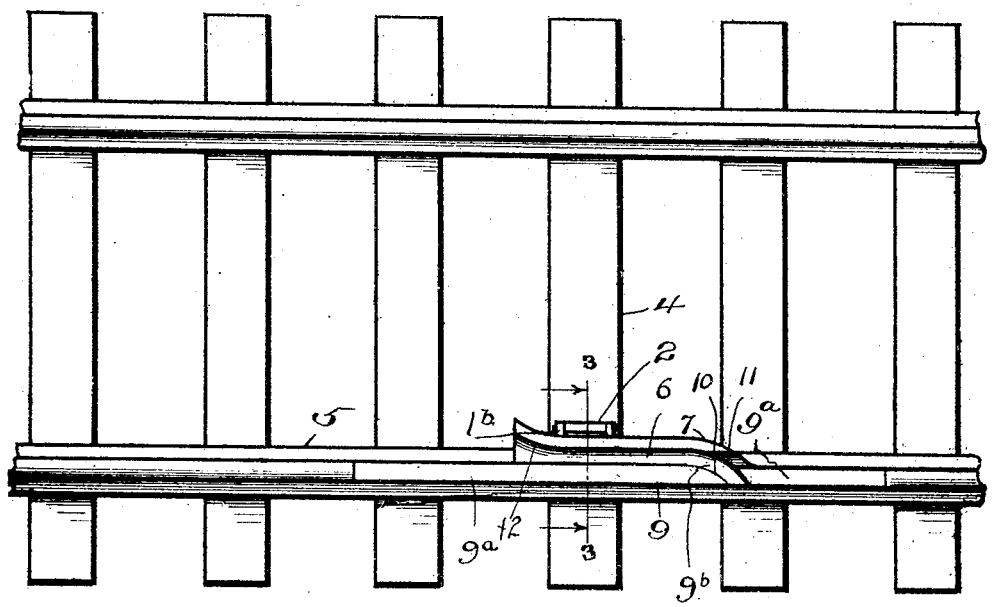
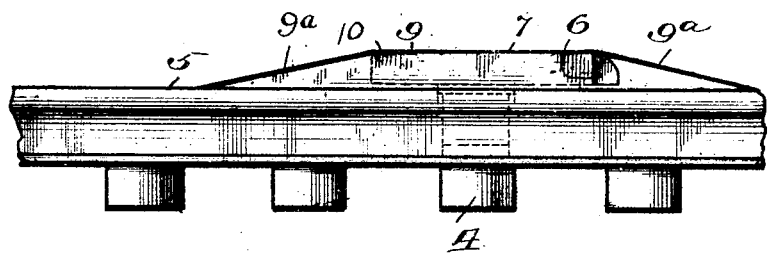
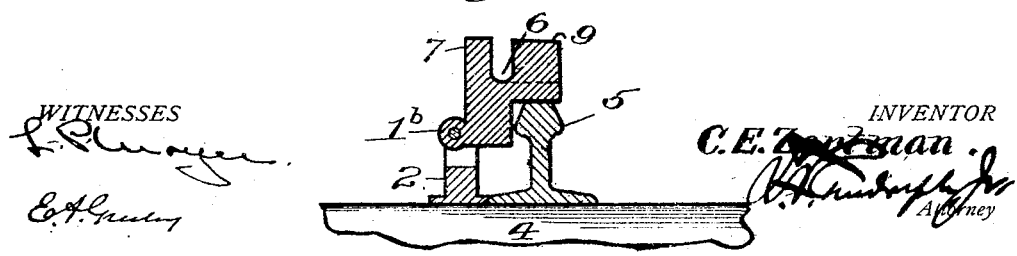
WITNESSES
INVENTOR
C. E. Zortman

UNITED STATES PATENT OFFICE.

CHARLES E. ZORTMAN, OF PITTSBURGH, PENNSYLVANIA.

DERAILING DEVICE.

1,368,008.  Specification of Letters Patent.  Patented Feb. 8, 1921.

Application filed June 6, 1917. Serial No. 173,145.

*To all whom it may concern:*

Be it known that I, CHARLES E. ZORTMAN, a citizen of the United States, residing at Pittsburgh, in the county of Allegheny and State of Pennsylvania, have invented certain new and useful Improvements in Derailing Devices; and I do hereby declare the following to be a full, clear, and exact description of the invention, such as will enable others skilled in the art to which it appertains to make and use the same.

This invention relates to derailing devices, and its object is to provide a simple, inexpensive and reliable device of this nature that can be easily moved to operative or inoperative positions, and when in operative position will permit a car to pass freely over it and onto the siding, but will effect derailment of the car when the latter is carelessly or accidentally moved in the direction of the main line.

Another object of the invention is the provision of a derailer that can be conveniently and expeditiously moved to inoperative position so as to admit cars to pass freely in either direction.

Other objects will appear and be better understood from that embodiment of the invention of which the following is a specification, reference being had to the accompanying drawings forming a part thereof, in which:

Figure 1 is a plan view of the derailer, showing the same in operative position on one of the tracks of a siding, Fig. 2 is a side elevation thereof, and Fig. 3 is a cross section, taken on the line 3—3 of Fig. 1.

Referring to the drawings in detail, the derailing device consists of a block having a hinged connection, as at $1^b$, to a base 2, the said base 2 being disposed inwardly of one of the rails 5 of a siding, adjacent to the rail, so that the hinged block can be readily moved into position where it will overlie the rail, as shown in Figs. 1 and 3 of the drawings. The block is divided, by means of a groove 6, into a guard section 7 and a tread section 9. The tread section 9 is of a length considerably greater than the length of the guard section 7 and has the opposite ends of the upper surface thereof inclined downwardly toward the tread of the rail 5, as shown at $9^a$. The groove 6 has one end deflected outwardly and opening into the outer side of the tread section 9, as shown at $9^b$, so as to provide a curved portion 10 in the tread section 9.

When the derailing device is in the positions shown in Figs. 1 and 2, and a car is moving in a direction toward the main line, the wheel of the front truck will ride up the inclined portion $9^a$ and along the horizontal portion of the tread section, the flange of the wheel traveling in the groove 6, and when the flange of the wheel reaches the curved portion 10, it will follow the same and the curved portion $9^b$ of the groove 6 and effect deflection of the car wheel from the siding. The curved or deflected end of the groove 6 communicates with an opening, or groove 11, which is of sufficient width to permit of the passage of a flanged car wheel in a reverse direction over the tread section 9 without causing derailment of the car. When it is desired to move the derailing device to inoperative position, the same is swung on the hinge A, so as to move the derailing device from the adjacent rail 5 and position the same at the inner side of the mentioned rail. When the derailing device is thus in inoperative position, a car can pass in either direction along the siding without being interrupted in its travel. The guard section 7 has the inner end thereof deflected laterally, as shown at 12, to admit of the entrance of the flange of a wheel into the groove 6 without danger of coming in contact with the inner or forward end of the guard section 7. The groove 6 is of a greater width and depth than the flange of a car wheel, so as to leave the flange free from contact at all points during the travel of the car wheel onto the tread section 9.

It is evident that various changes might be resorted to in the construction, form and arrangement of the several parts without departing from the spirit and scope of the invention as claimed.

It will be understood moreover that the abruptness of the curve of the flange guiding and deflecting groove at $9^b$ may be modified to insure the described operation, the limitations of the drawing being such as to make it impossible to represent the precise dimensions required in practice and which are dependent in a measure upon the angle of deflection of the sliding switch.

Having thus described my invention what I claim as new, is:

A derailer comprising a block having beveled end terminals, the block being provided at its upper side with a channel which is flared at one end and at the inner end of one of the beveled terminals of the block, the opposite end of the channel being curved transversely across the block and opening at the side of the block at a point between the ends of the other beveled terminal, the intermediate portions of the walls of the said channels being parallel with each other and parallel with the sides of the block, the block being further provided upon its upper side with a supplemental channel opening at one end at the end of the intermediate portion of the block and communicating at its opposite end with the first mentioned channel at the intermediate portion thereof, the side walls of the supplemental channel being in alinement with the intermediate parallel side walls of the first mentioned channel.

In testimony whereof I affix my signature in presence of two witnesses.

CHARLES E. ZORTMAN.

Witnesses:
A. H. SLATER, Jr.,
PAUL B. HAWK.